L. WACHENBERG.
FILTER.
APPLICATION FILED APR. 5, 1919.
1,337,170. Patented Apr. 13, 1920.
4 SHEETS—SHEET 3.
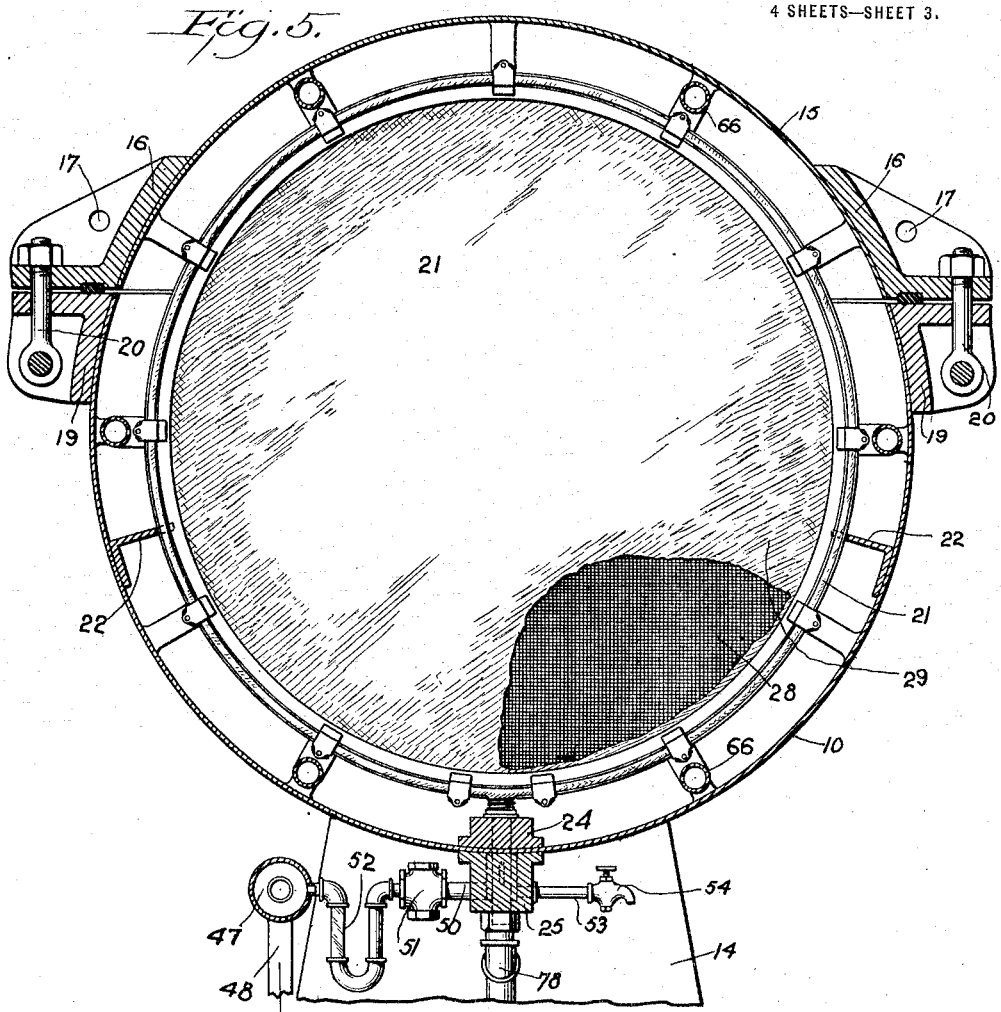
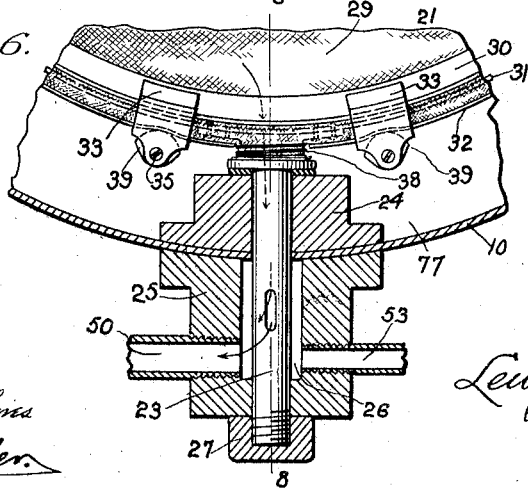
WITNESSES
INVENTOR
Lewis Wachenberg
BY
ATTORNEYS

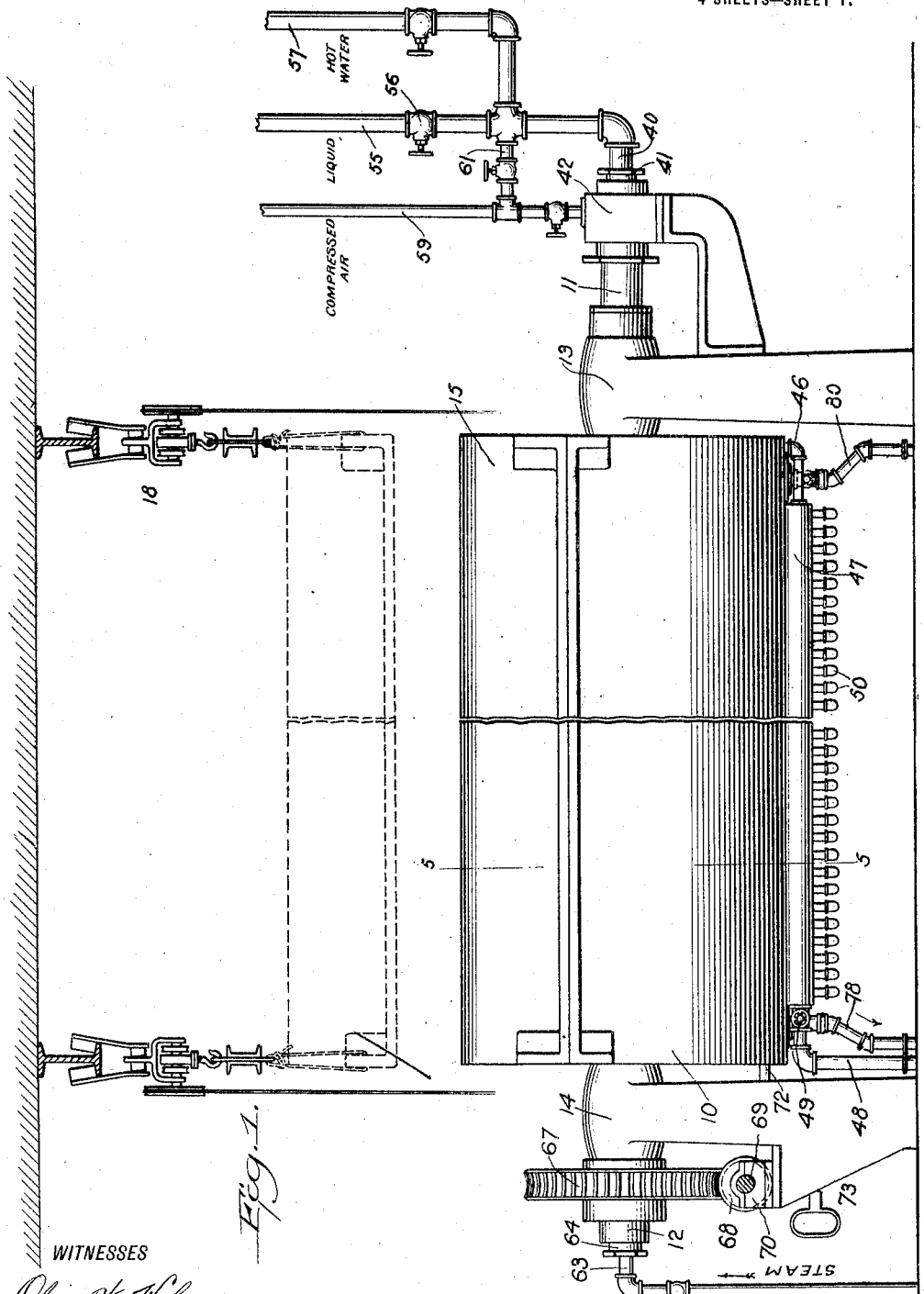

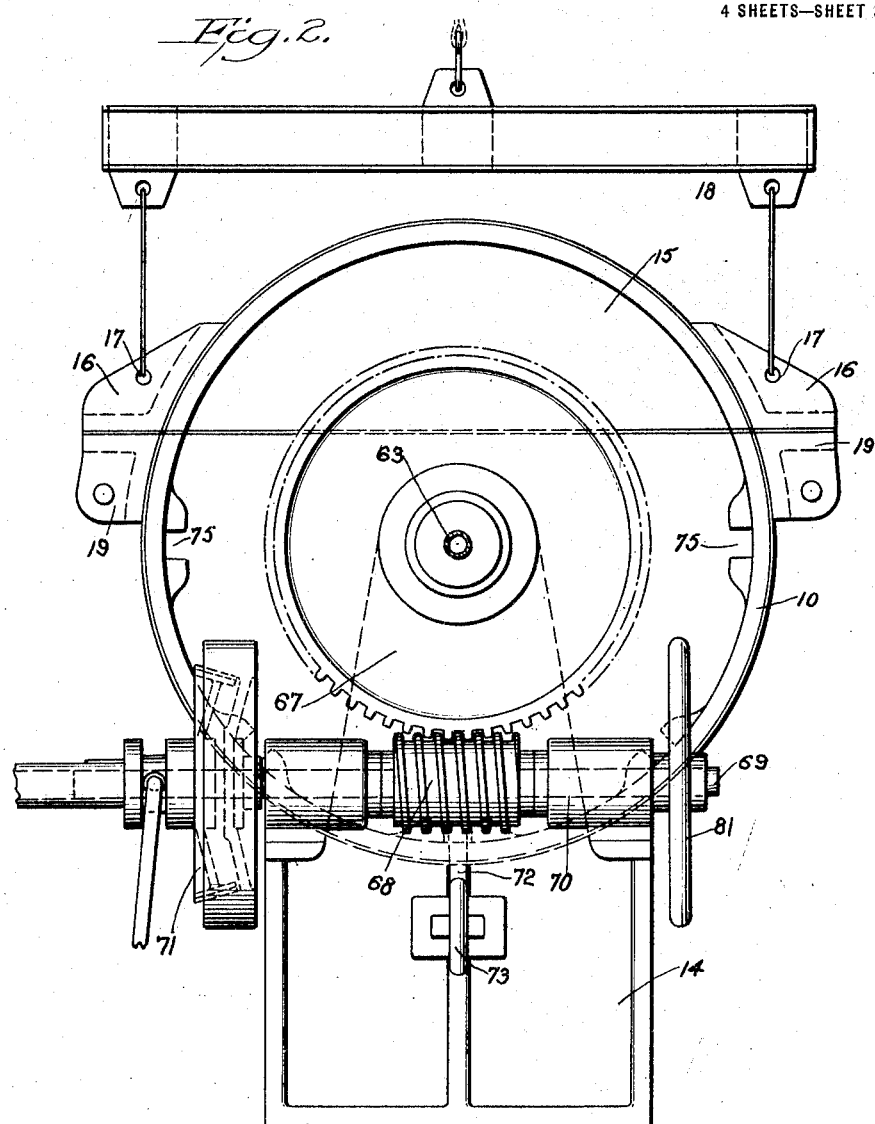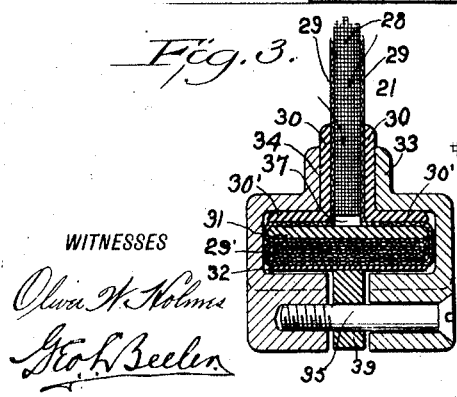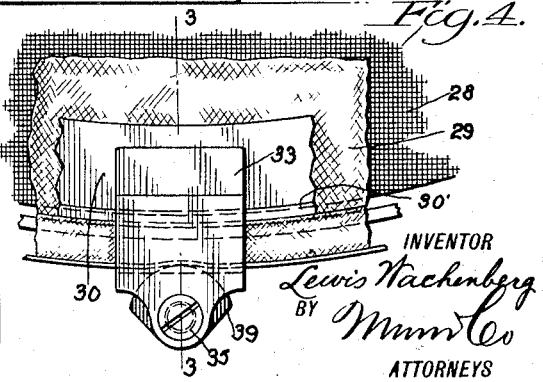

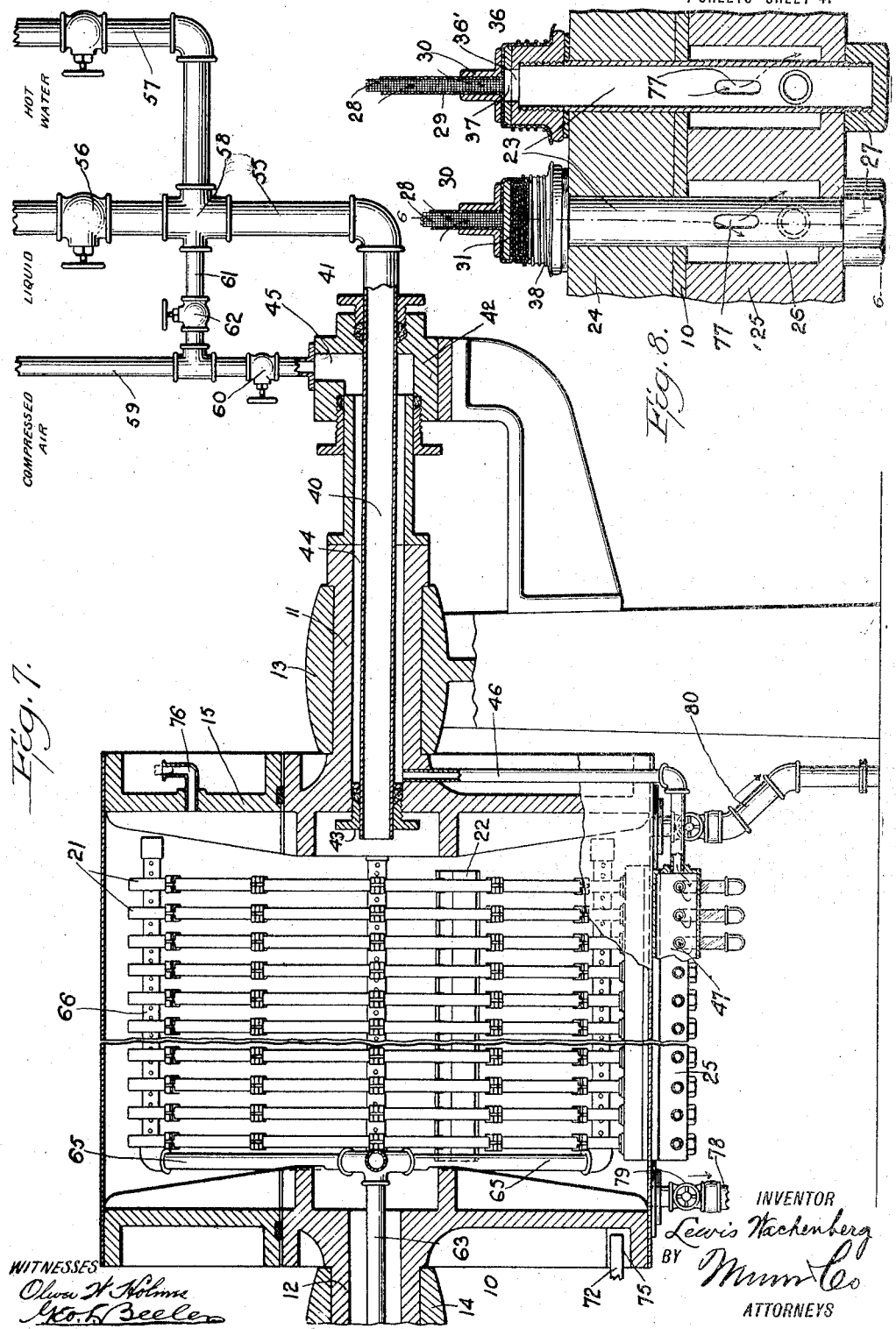

UNITED STATES PATENT OFFICE.

LEWIS WACHENBERG, OF NEW YORK, N. Y.

FILTER.

1,337,170.   Specification of Letters Patent.   Patented Apr. 13, 1920.

Application filed April 5, 1919. Serial No. 287,664.

*To all whom it may concern:*

Be it known that I, LEWIS WACHENBERG, a citizen of the United States, and a resident of the city of New York, borough of the Bronx, in the county of Bronx and State of New York, have invented a new and Improved Filter, of which the following is a full, clear, and exact description.

This invention relates to filters such for example as those that are commonly used for commercial purposes in the manufacture or refining of sugar or other analogous commodities or processes.

Among the objects of this invention is to provide a construction of a compact nature but having large capacity for the output therethrough, but which being relatively small in size and being equipped with special means for manipulation provides for the cleansing, renewal or interchange of the filtering elements with convenience, and thereby providing ample room to accommodate a considerably larger number of filters or filter press units in a given space than has heretofore been possible.

Another object of the invention is to improve the construction of filter plates or frames with respect to the manner and convenience of applying thereto the filtering cloths.

Another object of the invention is to improve the facilities for cleansing the filter press and especially the removal of scum, mud or sludge from the filter plates thereby renovating the filtering cloths and making them practically equal to new cloths so as to maintain the same construction in usable condition for long periods of time.

More specifically stated the improvement comprises a casing or drum of any suitable size, design or capacity into and through which the liquor to be filtered is caused to pass and having arranged within it a plurality of filter plates so made and connected that the filtrate may pass through the same with the maximum facility and volume, and means being provided to apply a cleansing medium through the filtering plates in a reverse direction to that of the movement of the filtrate so as to remove the deposits from the outside of the plates in the most logical manner or direction of action.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation of the preferred embodiment of my invention arranged for filtering operation, and indicating thereover the relation of the overhead power means for the lifting of the cover from the drum.

Fig. 2 is an end view of the same looking toward the right in Fig. 1, but with the power means shown as attached.

Fig. 3 is an enlarged sectional detail of the filter plates on the line 3—3 of Fig. 4.

Fig. 4 is a side elevation of the same detail.

Fig. 5 is a vertical transverse section on the line 5—5 of Fig. 1.

Fig. 6 is an enlarged transverse sectional detail on the line 6—6 of Fig. 8.

Fig. 7 is a fragmentary vertical longitudinal section of the apparatus; and

Fig. 8 is an enlarged vertical longitudinal sectional detail on the line 8—8 of Fig. 6.

Referring now more specifically to the drawings I show a main casing or drum 10 having a main body portion with coaxial trunnions 11 and 12 journaled for rotation in any suitable stationary standards or bearings 13 and 14 respectively and having a removable but normally hermetically sealed cover 15, the same being shown as provided with hanger lugs or brackets 16 having holes 17 for the application of the overhead hoisting means 18. The lugs 18 carried by the cover mate with lugs 19 fixed to the main portion of the drum and carrying pivoted hanger bolts 20 for clamping the cover in place.

While the drum may have any desired size or form it is shown as being cylindrical with the ends or heads thereof of suitable strength for the purposes of the invention, but with the space between the heads free for the insertion and manipulation of the filter plates 21, the same being shown in this instance as being circular or disk like and arranged in spaced parallel vertical transverse planes from one end or head of the drum to the other. The plates 21 are held in proper position by any suitable means such as a plurality of racks 22 extending longitudinally along the inner wall of the main portion of the drum. (See Figs. 5 and 7). Each plate furthermore is locked in place in coöperation with the racks 22 by means of a delivery nozzle 23 projecting through the bottom of the drum and through inner and outer reinforcement members 24 and 25 respectively, the latter having independent outlet chambers 26, the nozzle 23 having finally on its lower end a cap nut 27 serving two functions,—to seal the otherwise open end of the nozzle and to lock the same rigidly in place.

With reference now to Figs. 3, 4 and 5 each filter plate 21 is preferably made up as follows: 28 is a flat reticulated body made of wire gauze, or its equivalent, of a strong and durable nature and of proper form to establish the size and form of filter plate that may be found most suitable for any filter press. On the opposite faces or sides of the core 28 are sheets 29 of suitable fabric or filter cloth of the same general form as the body or core but preferably of larger diameter so that an appreciable amount of fabric edges would be projected beyond the body. On the opposite sides of the edge portions of the filter plate are two frames 30 shown as of angle structure with their outer flanges projected laterally from each other at 30'. A strong hoop 31 is then slipped over the flanges 30', the projecting edge portions 29' of the filter cloths projecting laterally in opposite directions between the hoop 31 and said frame flanges 30'. Said cloth edges are then brought together and folded into a compact mass on the outside of the hoop 31 and then a flexible band 32 is applied therearound. Pairs of clamp members 33 and 34 in suitable numbers are then applied over these frames and bands and which after being tightened together by any suitable means such as binding screws 35 acting through the members 33 into the members 34 the attachment of the filter cloths may be made secure under proper tension and without any possibility of leakage of the liquor to be filtered. The above mentioned delivery nozzle 23 is secured firmly into a coupling 36 having a port 36' in direct communication with the peripheral passageway 37 surrounding the periphery of the core 28. In the region of the coupling 36 the edges 29' of the filter cloths are wrapped or otherwise secured around the coupling as shown at 38. After the clamps 33 and 34 are put in place as described and drawn firmly toward each other, a series of cams 39 journaled on the respective clamp bolts 35 are turned so as to put the flexible band 32 under considerable radial compression and making secure the sealing of the joint along the edges of the cloths entirely around each of the filter plates. The frame members 30 and the parts associated therewith constitute in their assembled position rigid strong frames or binders for the filter plates.

The trunnions 11 and 12 are both preferably tubular or hollow and projecting inward through the hollow trunnion 11 is an inlet nozzle 40 having a stuffing box connection 41 with a stationary arm bearing 42 and having a stuffing box 43 within the admission head of the drum. The nozzle 40 is thus held stationary while the drum may at times rotate therearound. The inlet nozzle is smaller in diameter than the bore of the trunnion 11 whereby there is observed a cylindrical channel 44 leading from a chamber 45 in the bearing 42 to a pipe 46 extending radially along the drum head to a delivery manifold 47 parallel to and on substantially the same plane as the outlet bar 25 above described. The remote end of the manifold 47 is provided with a discharge pipe 48 access to which is controlled by a valve 49.

For each outlet chamber 26 of the outlet bar 25 I provide a transfer member in the nature of a pipe 50 communicating at one end with the chamber 26 and at its other end with the delivery manifold 47. The pipe 50 is fitted between its ends with two important features namely a shut-off valve 51 and a sight glass 52. Communicating with another part of each of the outlet chambers 26 is a pipe 53 having at its outer end a normally closed test cock 54.

55 indicates a main admission pipe for the liquid to be filtered, the same communicating with the inlet nozzle 40 and controlled by a valve 56. A branch pipe 57 communicates with the main pipe 55 through a union 58 below the valve 56. Another pipe 59 having a normally closed valve 60 communicates with the chamber 45 leading toward the channel 44. A connecting pipe 61 having a normally closed valve 62 leads between the pipes 55 and 59.

The hollow trunnion 12 at the remote end of the drum from the inlet devices accommodates a pipe 63 arranged coaxial of the filter drum while the space surrounding the pipe is fitted with a packing gland 64. To the inner end of the pipe 63 are connected a series of radially disposed arms or pipes 65 each terminating in a spraying nozzle 66 just within the wall of the drum. In Fig. 5 I show six of these nozzles 66 arranged between the peripheries of the filter plates and the cylindrical wall of the drum.

Fixed in any suitable manner to the trunnion 12 just beyond the bearing support 14 is a worm gear 67 meshing with a worm 68 connected to a driving shaft 69 journaled in bearings 70. A clutch 71 controls the operation of the driving shaft 69 from any suitable source of power from which it is understood also that any other suitable driving means than the worm gearing might be employed, but the worm gearing is preferred because of the fact that it constitutes automatic locking means holding the drum from rotation during the normal filtering operation. Additional locking means, however, comprising a bolt 72 with a handle 73 at its outer end may be employed as a positive lock in coöperation with any suitably arranged notches 75 in one end of the drum.

With the apparatus constructed and adjusted as shown in the drawings and with the drum stationary, liquid to be filtered is admitted through the pipe 55 and nozzle 40 under suitable pressure filling the interior of the drum. Any suitable air vent 76 may be provided to facilitate this initial filling. The liquid to be filtered naturally comes into direct contact with both sides of all of the filter plates, the pressure of which against the cloths 29 is borne by the metal gauze 28. The pressure being normally the same on both sides of the filter plates there is no tendency for the pressure to warp, break or damage any part of the mechanism. The filtrate passing through the cloths 29 finds its way along the wire mesh or the like of the members 28, thence along the passageways 37 through the nozzles 23 and out through any suitable arranged ports 77 into the outlet chambers 26 thence out through the several transfer members 50 into the delivery manifold 47 and pipe 48 leading to any suitable receiver for the filtrate. This operation may be continued until the filter plates become foul or occluded by any accumulation of sediment, mud or the like solids or impurities, the retention of which is the primary function of the machine. The operator by inspection of the operation at the sight glasses 52 may observe at any time the operation of the several filter plates, determining at a glance whether the filtrate is running clear or pure. If he wishes to take a sample of the filtrate for chemical or other analysis he may do so at any time through a cock 54. If any one or more of the filter plates should operate imperfectly or are delivering cloudy liquid or for other reason such action may be desirable the action thereof may be cut off at any time by closing the valves 51, an expedient of considerable importance in view of the fact that the filter as a whole may continue in usable condition for a considerable length of time after one or other small number of the filter plates become foul, so until the filtering operation be stopped for the purpose of cleansing the apparatus as many of the filter plates as are operating satisfactorily may be continued while others thereof may be shut off and held in idle position.

When cleansing is required, after a number of hours of use of the filter, the liquid contained within the drum may be delivered or drained therefrom through a pipe 78 having a normally closed valve 79, the same being returned to the original vat or otherwise for subsequent treatment. The valve 56 being closed hot water or other cleansing medium will be admitted through the pipes 57 and 55, and nozzle 40 partially filling the drum. Air under pressure or other suitable cleansing fluid such as water or steam may then be admitted through the pipe 59, channel 44, pipe 46, delivery manifold 47 and in a reverse direction through the individual transfer members 50 through the several filter plates, the action of which serves to dislodge the accumulations of mud, sediment or the like from the filter cloths 29. With the disconnection of the pipe connections at the bottom of the drum and the unlocking of the positive bolt 72 the drum may be caused to rotate at a suitable rate of speed through the driving gear 67 and 68 in order to provide a suitable agitation of the cleansing mediums within the drum. During this operation I admit steam through the pipe 63, arms 65 and perforated nozzles 66 with the dual effect of spurting steam in the upper portion of the drum directly against the filter plates not covered with water, and secondly the turbulent agitation of the water through which the steam is admitted at the bottom. The admitted steam furthermore serves to keep the wash water hot within the drum. At any time the accumulation of muds, sludge or other solid particles washed from the filter plates may be discharged through a drain pipe 80. The rotation of the drum during the washing operation of the filter plates is of prime importance in the effecting of the desired object. After a few minutes of rotation or churning effect during the cleansing process the cleansing operation is completed and is uniform throughout all of the filter plates leaving them again fresh and clean and in practically the same condition as when first introduced. A hand wheel 81, or its equivalent, is provided in connection with the drive shaft 69 for the manipulation of the drum while positioning it for the most convenient admission or withdrawal of the filter plates or like purposes. Ordinarily the cover 15 will be upright as shown in Fig. 2 for the removal thereof by the overhead hoisting gear 18, but after the cover is removed it is desirable that the drum be rotated so as to tilt it for the most convenient access. This naturally may easily be effected by manipulation of the hand wheel 81 while the clutch 71 is released.

I claim:

1. In a filter, the combination of a drum rotatably mounted at each end on a hollow trunnion, means to deliver into the drum through a hollow trunnion a liquid to be filtered, means to deliver the filtrate from the drum, filtering means within the drum through which the filtrate is caused to pass leaving accumulations of solid matter, means to deliver a cleansing fluid through said hollow trunnion independent of the liquid to be filtered in a reverse direction through the filtering means, means to deliver a cleansing fluid against the outer side of the filtering means simultaneously with the forcing of the cleansing fluid in the reverse direction, and means to rotate the drum during the cleansing thereof.

2. In a filter, a drum, supporting means for the drum including hollow trunnions, filtering means within the drum, means to admit through one of said trunnions a liquid to be filtered, means to admit a cleansing medium through said trunnion so as to pass through said filtering means in a direction opposite to the direction of said liquid, means to admit through the other of said trunnions a cleansing medium, and means to rotate the drum during the cleansing operation.

3. In a filter, a rotatable drum having end supporting means including a hollow trunnion, filtering means within the drum, means to admit through said trunnion a liquid to be filtered, means to admit through the same trunnion and around the liquid admitting means a cleansing medium for action upon the filtering means in a reverse direction to that of the filtrate, and means to rotate the drum.

4. In a filter, the combination of a drum, supporting means for the drum including hollow trunnions, filtering means within the drum, means to admit through one of the trunnions a liquid to be filtered, means to admit through both of the trunnions independent cleansing mediums for action in different directions upon the filtering means, and means to rotate the drum during the cleansing of the filtering means.

5. In a filter, the combination of a drum, a pair of trunnions to support the drum for rotation around an axis, at least one of the trunnions being hollow, filtering means within the drum, means to admit within the drum through said hollow trunnion a liquid to be filtered for passage in one direction through the filtering means causing the accumulation on the outsides thereof of the solid matter, and means to admit a cleansing medium through said hollow trunnion independent of said liquid to the drum for dislodging the solid matter from the outsides of the filtering means in a direction reverse to the direction of the filtrate.

6. In a filter, the combination of a drum, a pair of trunnions, means for supporting the drum for rotation around an axis, filtering means within the drum, means to admit liquid to be filtered through one of the trunnions with movement of the liquid in a certain direction, means to admit a cleansing medium into the drum through the trunnion just mentioned for action upon the filtering means in a direction reverse to that of the filtrate, and means to rotate the drum, substantially as set forth.

7. In a filter, the combination of a drum, means to support the drum for rotation around an axis, means to rotate the drum, filtering means within the drum for the separation of solid matter from the filtrate, and means to admit into the drum different cleansing mediums along independent channels coaxially of the drum, one medium passing through the filtering means in a direction reverse to that of the filtrate, while the other cleansing medium is delivered on the outside of the filtering means.

LEWIS WACHENBERG.